June 16, 1931. L. T. KINCANNON 1,810,138
ARTICULATED TRACTOR TRACK
Filed July 27, 1928 2 Sheets-Sheet 1
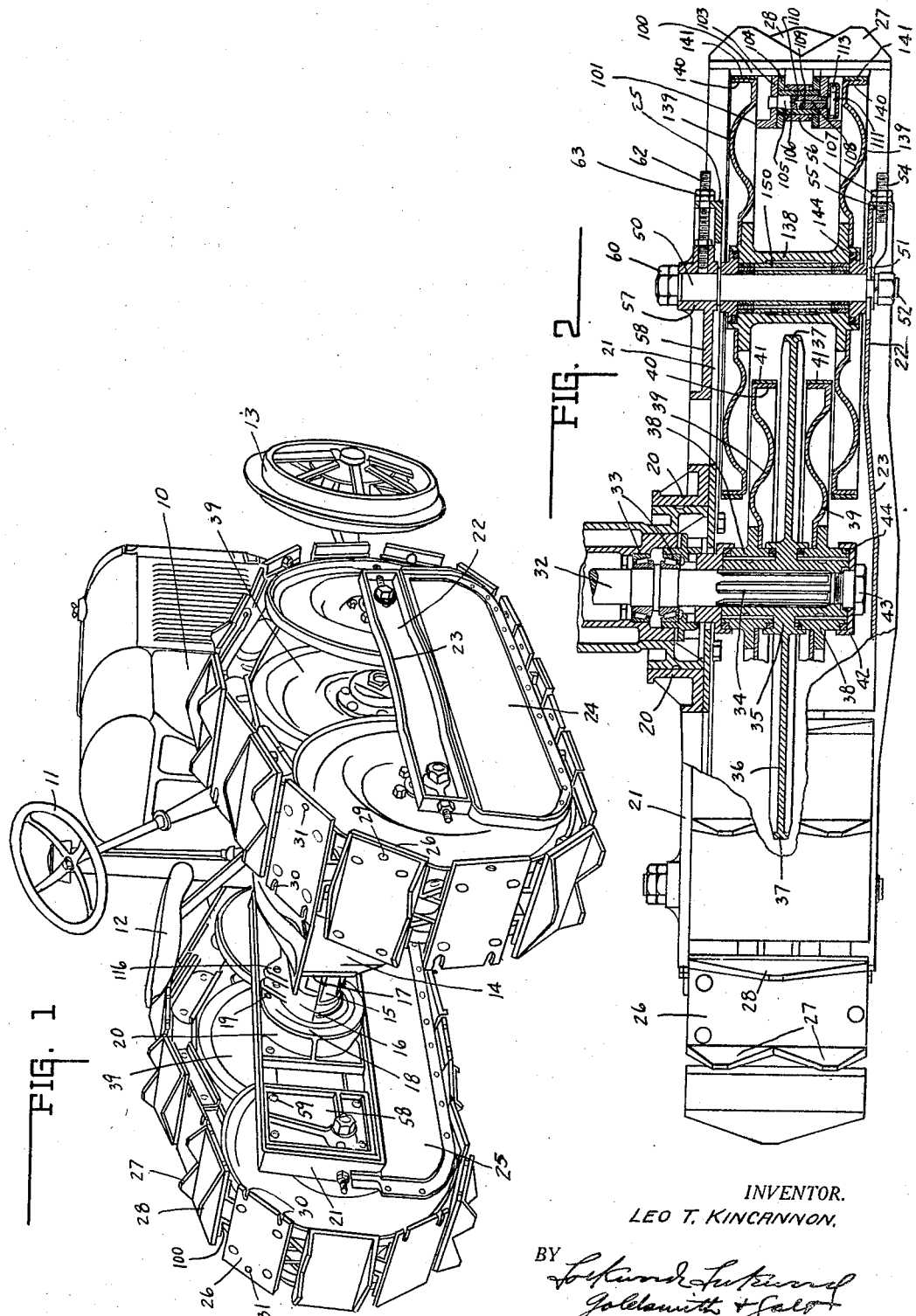
INVENTOR.
LEO T. KINCANNON.
BY
ATTORNEYS.

June 16, 1931.    L. T. KINCANNON    1,810,138
ARTICULATED TRACTOR TRACK
Filed July 27, 1928    2 Sheets-Sheet 2
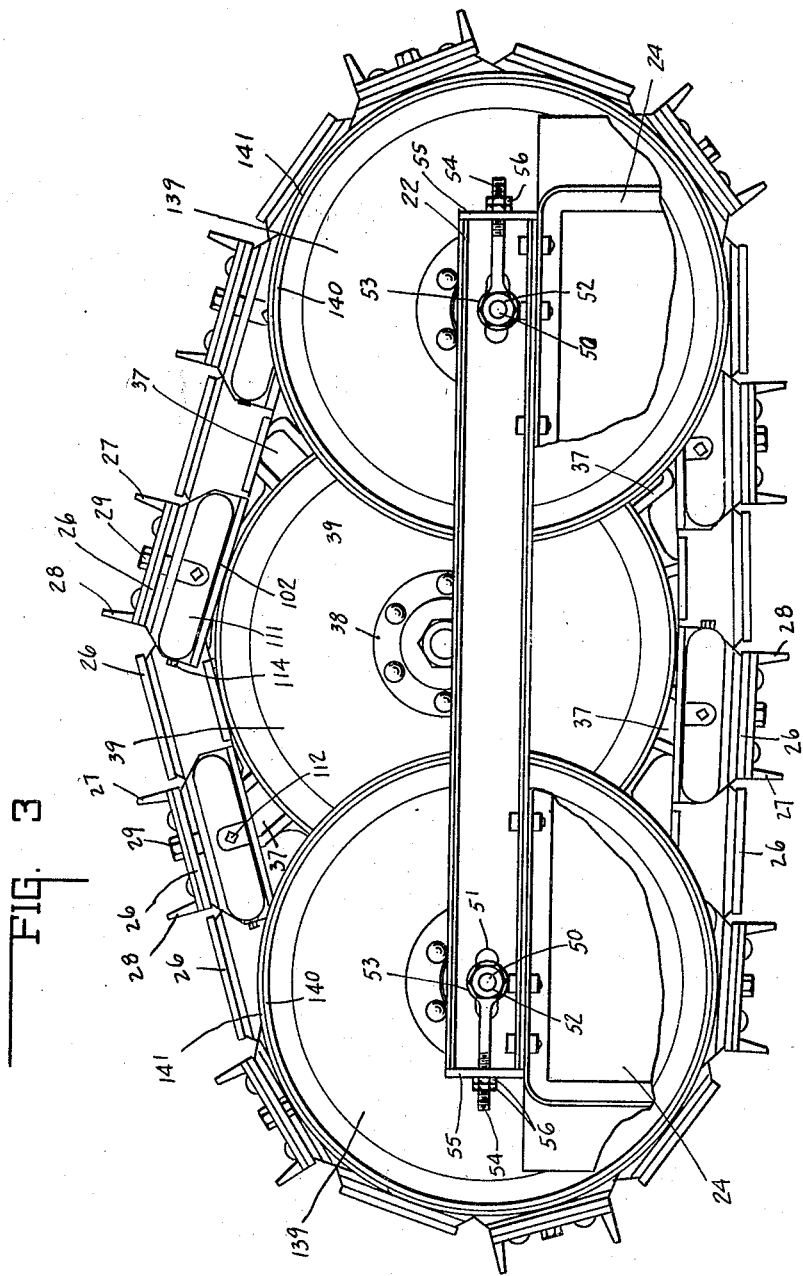
INVENTOR
LEO T. KINCANNON.
BY
ATTORNEYS.

Patented June 16, 1931

1,810,138

UNITED STATES PATENT OFFICE

LEO T. KINCANNON, OF SCOTTSDALE, PENNSYLVANIA, ASSIGNOR TO MARION MACHINE FOUNDRY & SUPPLY COMPANY, OF MARION, INDIANA, A CORPORATION

ARTICULATED TRACTOR TRACK

Application filed July 27, 1928. Serial No. 295,663.

This invention relates to an articulated track frame suitable for tractors and the like.

The chief object of the invention is to provide an articulated track frame suitable for mounting upon tractors by replacing the power wheels thereof and the forward wheels if and when desired.

One of the first features of the machine consists in the construction of each wheel replacing track frame so that the driving sprocket does not carry the weight of the chain, tractor, or other superimposed equipment but is used solely for the purpose of driving the chain. This result is accomplished by the employment of two idler disc wheels rotatively mounted (one on each side) upon the hub of the drive sprocket. These idler discs are of such diameter that they hold the root of the sprocket tooth away from the chain rollers.

Another feature of the invention consists in the formation of the track frame of but few similar members. In other words, standardization of parts is utilized to the maximum degree and as herein disclosed, the number of different parts does not exceed forty-five. The parts are likewise so fashioned that they may be used for either a right hand track frame or a left hand track frame since the parts are symmetrically formed.

The full nature of the invention will be understood from the accompanying drawings and the following description and claims:

In the drawings Fig. 1 is a perspective view of a tractor having its power wheels removed and a pair of track frames substituted therefor. Fig. 2 is an enlarged top plan view of a track frame, parts being broken away to show other parts in section. Fig. 3 is a side elevational view of the exterior side of one of the track frames, parts being broken away to show the interior portion thereof.

In the drawings 10 indicates the body portion of a tractor having the conventional steering wheel 11, seat 12 and forward guiding wheels 13 controlled by the steering wheel 11. The differential housing is indicated by the numeral 14 and extending laterally thereof is the axle housing 15, which herein is shown covered by an arcuate casting 16 which is bolted to the differential housing as at 17 and the opposite end of said casting 16 terminates in a cylinder upon which the main frame bearing of the adjacent track frame is pivotally mounted. The casting 16 is provided with a pair of ears 116 adapted for attachment to other implements, such as a grader.

A rectangular inner frame 21 and a smaller rectangular frame 22 comprise, respectively, the inner and outer frames. The outer frame is offset as at 23 and secured thereto in depending relation is a guide plate 24 while secured to the inner frame member 21 in depending relation is the guide plate 25.

The tread plates 26 extend laterally of the frames and project laterally beyond the supports therefor. The alternate tread plates are each provided with a pair of lugs 27 at one end and a single intermediate lug 28 at the opposite end. This is for balancing and straight driving. Each alternate plate 26 is thus provided although each plate may be so provided if desired. The lugs 27 and 28 are formed from standard channels and each channel is secured by one bolt and two shoulder rivets, said rivets projecting into slots 30 in one end of the plate and the bolt through the median positioned opening 31 at the opposite end of the plate. The slots are upon the inner edge of the tread plate and the opening is adjacent the outer edge of the tread plate. This construction permits the lugs to be applied to each tread plate from the outside and with a minimum of parts and also permits the same to be formed from standard channel material or to be cast as desired. By the use of the slots 30 upon the inside edge of the plate 26 and the opening 31 upon the outside edge of the plate each channel can be secured with a single fastening means.

Special shouldered rivets are receivable by the slots 30 in sliding relation, said rivets being carried by the channels. A single bolt passing through the channel plate and the bolt opening 31 of the tread plate 26 rigidly secures the channel to the tread plate. With this arrangement the lugs can be applied to the chain from the outer side of the track and successively applied thereto.

Furthermore, the present chain while including twenty links employs but ten bolts and twenty rivets. Ordinarily lugs for a twenty-link chain require forty bolts, half of which are on the inner side of the chain and half of which are on the outer side, the former being exceedingly difficult to get at or work upon. This arrangement, therefore, not only economizes on material but also reduces to a minimum the number of parts to be drawn together through the bolt and nut arrangement. It will also be noted that the three adjacent lugs are formed from a single standard channel and that only one channel is applied to each alternate tread plate so that in effect the same result is obtained as if a single lug were applied to each tread plate.

The link chain included in each track is driven by an axle 32 which is rotatably mounted by a pair of opposed double cone races 33, said axle and cone races and housings, as shown herein, are parts of a standard tractor known as the International. The axle projects beyond the anti-friction bearings and has its end provided with a plurality of splines 34 and connected therewith by said splines and mounted thereon is the hub 35 of the sprocket or driving gear 36 having the teeth 37 for link engagement. Positioned at each side of the central radial portion of the hub is a free running sleeve 38 secured to which is an annularly corrugated disc 39 terminating in a lateral rim 40. A pair of the aforesaid is positioned in opposed relation and herein these discs are provided with annular bearing tires 41 which preferably are shrunk thereon.

As shown clearly in Figs. 1 and 3, the two discs 39 support the weight of the tractor upon the chain or linkage to which the track plates are secured. The hub of the sprocket and the several sleeve hubs 38 are retained in position upon the axle by the cap 42 and nut 43 or any equivalent means. As indicated at 44, suitable washers, which are of the lubricating character and also of the dust and dirt preventing character are employed wherever there is relative rotation between the parts. The offsetting 23 of the member 22 is provided, see Figs. 1 and 2, to permit access to the axle cap and nut before mentioned. Also see the same figures, the plate 20 which has a rectangular base portion is riveted centrally in the rectangular frame 21 formed by a standard angle.

The sprocket engages the upper run of the chain substantially at its mid-portion and carries substantially none of the weight of the said chain as beforementioned, since the discs 39 support the same. The discs and concentric driving gear are positioned intermediate the front and rear idler supports. The front and rear idler supports each comprise a pair of discs 139 identical with discs 39 having the rims 140 with the tire portions 141, which tire portions support the plates in the movement of the chain. Instead of each disc being supported by an individual hub, as previously described, a single hub 138 is provided and the discs are supported thereby with their laterally projecting rims turned outwardly and away from each other, whereas, the discs 39 are turned inwardly and towards each other.

In order to obtain suitable tension in the chain and to maintain the lower and weight supporting run thereof substantially parallel the two idler constructions, the front and rear, including the discs 139 are mounted upon the shafts 50 which project through the elongated and longitudinally positioned slots 51 in the rectangular outer frames 22. This end of each axle includes the usual locking means in the form of the bolt 52 and mounted upon the same is an eye bolt having the eye portion 53 and the threaded portion 54 which extends through the end plate 55 apertured for said purpose and mounts thereon the locking and adjusting nuts 56. In this way the outer ends of both front and rear axles 50 may be adjusted towards and away from each other and since the tendency is to draw the parts inwardly the nuts 56 retain the axles 50 in substantially rigid relation.

Each inner end of said axles extends through the rectangular open framework 21 and into a bearing 57 formed in a rectangular plate 58 which is slidably mounted in and upon said rectangular framework 21 by means of the four bolts 59 positioned in elongated slots formed in said framework. The axle is retained in position by suitable means such as the locking nut or nuts 60. To align the axles so as to be parallel to the axle 32 each framework is provided with a threaded bolt extension 62 which mounts the locking and adjusting nuts 63 for maintaining the axle bearing framework 58 in the adjusted position. The connection between the hub and the axle 50 is a free-running and lubricated construction and similar washers 144 are included as well as a plurality of concentric sleeves 150.

From the foregoing, it will be understood that the axles 50 are maintained in substantially parallel and fixed relation and may or may not rotate as desired but the hub 138 does rotate with and by the tires 141 in the movement of the chain and by the same. The front and rear idler discs carry part of the weight of the tractor and chain. Thus part of the weight of the tractor is carried through the two inner and outer rectangular frameworks 21 and 22 and the axles 50, while the remainder of the weight of the tractor and chain is carried by the intermediate inner discs adjacent the driving sprocket. Each track frame includes six overlapping, identical pressed steel discs with laterally directed peripheries which form the supporting track for the chain tread to travel upon.

The general arrangement of the aforesaid construction makes it possible for the sprocket to drive the chain at the top of the run rather than at the bottom. This is essential to have if the flexible chain is to be stretched tight on the lower or ground run thereof. The chain itself is in tension from the point of contact with the sprocket on top and around the rear idler disc and along the ground to the front idler. This tension tends to keep the chain straight and puts pressure upon the ground between the idlers. This top drive is made possible by the fact that the center of the driving sprocket is above the center of the idlers, thereby leaving the lower portion of the chain straight and causing the top center part to have a bend in it, which top center part of the same, as before mentioned, is supported by the intermediate discs. This means of supporting the chain upon an idler and chain flange instead of upon a sprocket tooth and the chain pin causes the same, when bent, to be shortened in relation to the pitch of the sprocket. This shortening effect at the top causes the sprocket to come in contact with the chain on the top run when the sprocket is driving in either direction.

While practically any chain may be employed in the aforesaid relation, the present disclosure includes a chain or track made of two kinds of links.

Each of the tread plates 26 has riveted to its inner-face a pair of outwardly directed channels 100, the remote flange of which is cut away as at 101 to clear the discs. These channels project longitudinally beyond the tread plate 26, as shown between the plates in Fig. 1 and they are spaced so that successive tread plates have their channels in offset relation. One of the channels has its outer flange cut away as at 102, see Fig. 3, and the adjacent channel over-laps the same. This provides the two registering portions 103 and 104, each of which mounts a pin 105. A sleeve 106 maintains the outer channels in spaced relation and another sleeve roller 107 mounted thereon maintains the inner pair in spaced relation. The outer sleeve 107 constitutes the roller engageable by the sprocket tooth. It is positionable as indicated in Fig. 3, midway between two adjacent links. A passage 108 from one end of the pin has an angular discharge 109 to the sleeve 106 and sleeve 106 at 110 has the channel discharging to the interior of the roller sleeve 107. A magazine 111 is mounted as at 112 to the adjacent channel and the lubricant channels of the two pins communicate with the interior of the reservoir 111. The lubricant is supplied thereto at the end through the opening 113 and by a fitting 114 which may be a high pressure fitting if desired.

The invention claimed is:

1. A power operable load sustaining mechanism including an endless articulated tread composed of a plurality of plate constructions, each including inner and outer track portions, front and rear wheel supports for said tread, each including spaced portions for engaging one of the track portions, intermediate spaced wheel supports for engaging the other track portions, and a gear wheel operatively engaging only the upper run of said tread for driving the same.

2. A power operable load sustaining mechanism including an endless articulated tread, a plurality of front and rear wheel supports therefor, each including spaced portions, intermediate spaced wheel supports arranged in overlapping relation relative to the front and rear wheel supports, and a gear operatively engaging only the upper run of said tread for driving the same, each of said wheel supports being of substantially the same diameter and the gear being of greater diameter than and coaxial with the intermediate wheel supports and offset sufficiently from the plane including the front and rear wheel support axes whereby only the upper run of the tread is engaged by the gear.

In witness whereof, I have hereunto affixed my signature.

LEO T. KINCANNON.